United States Patent Office 2,745,877
Patented May 15, 1956

2,745,877

QUATERNARY PHOSPHONIUM COMPOUNDS

Jakob Bindler, Riehen, near Basel, and Ernst Model, Basel, Switzerland, assignors to J. R. Geigy A. G., Basel, Switzerland No Drawing. Application July 2, 1952,
Serial No. 296,947

Claims priority, application Switzerland July 6, 1951

7 Claims. (Cl. 260—606.5)

The present invention concerns the production of new water soluble, quaternary organic phosphonium compounds which even in very small concentrations can give lasting protection to keratin fibers, in particular wool, from attack by injurious insects. Wool treated with the new phosphonium compounds is well protected particularly from injury caused by Anthrenus and Attagenus larvae and also from damage caused by moths.

It has been found that the new compounds can be obtained by reacting halogen methyl ethers of the general Formula I

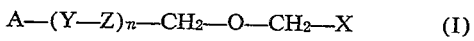

A—(Y—Z)$_n$—CH$_2$—O—CH$_2$—X     (I)

wherein A represents a radical, preferably a multi-halogen substituted radical, of the monophenyl, diphenyl or phenoxyphenyl series,
Y represents an oxygen or sulphur atom,
Z represents a low molecular alkylene radical
$n$ represents an integer of the value of 0 or 1 and
X represents halogen, preferably chlorine or bromine, with triphenyl phosphine to produce quaternary phosphonium compounds of the general Formula II:

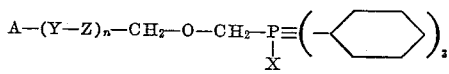

wherein A, X, Y, Z and $n$ have the meanings given above.

Halogen methyl ethers of the general Formula I usable according to this invention are obtainable from various starting materials by the following methods for example:

If monohalogen hydrins of low molecular aliphatic dialcohols are reacted with the alkali metal salts of aromatic hydroxyl or sulfhydryl compounds of the monophenyl, diphenyl or phenoxyphenyl series, which latter compounds are preferably multisubstituted in the nucleus with halogen, advantageously in the presence of inert solvents or diluents, the corresponding aryloxy or arylmercapto alkanols result. As monohalogen hydrins of low molecular dialcohols, for example, glycol chlorohydrin, 1.2- or 1.3-propylene chlorohydrin, 1.2-, 2.3- or 1.4-butylene chlorohydrin, 1.5-pentamethylene chlorohydrin or the corresponding bromohydrins can be used, whereby the easily accessible glycol chlorohydrin is to be preferred.

The aryloxy alkanols can also be obtained by reacting equivalent amounts of reactive alkylene oxides with aqueous solutions of the corresponding phenolates under mild conditions; as defined above, low molecular aliphatic epoxides should preferably be used, in particular ethylene oxide, and, if desired 1.2- or 1.3-propylene oxide or 1.2-isobutylene or 2.3-butylene oxide.

If the aryloxy or arylmercapto alkanols so produced are reacted at the usual or a lower temperature, preferably in inert organic solvents such as dethyl ether, dioxan, methylene chloride, benzene or toluene, with formaldehyde or agents giving off formaldehyde such as for example paraformaldehyde, and with hydrogen halide, preferably with hydrogen chloride or hydrogen bromide, the aryloxy or arylmercapto alkyl halogen methyl ethers of the general Formula I wherein $n$ equals 1 are obtained. The process of the production of the new compounds with excellent yields is to some extent astonishing when it is remembered that aralkyl ethers are often very easily split up under the action of strong mineral acids.

Very active compounds are derived for example from 4-chloro- or 4-bromophenol or -thiophenol, from 2.4- or 3.4-dichloro- or dibromophenol or -thiophenol, from 2.4.5-trichlorophenol, from 3-trifluoromethyl-4-chlorophenol, from 2- or 4-hydroxydiphenyl, from 3.5-dichloro- or dibromo-4-hydroxydiphenyl, from 4-(4'-chloro- or bromophenoxy)-1-hydroxybenzene.

The aryloxy or arylmercapto alkanols and aryloxy or arylmercapto alkylchloromethyl ethers obtained from these compounds according to the methods described are usually viscous colourless liquids or colourless crystalline bodies having a low melting point.

A further class of the halogen methyl ethers of the general Formula I wherein $n$ equals nil usable according to the present invention is obtained if benzyl alcohols, halogen substituted in the nucleus, indeed preferably more than once, are reacted with formaldehyde or agents giving off formaldehyde and hydrogen halide. It is also advantageous to perform the reaction at room temperature or under cooling and in the inert organic solvents and diluents given above. Suitable benzyl alcohols are for example, 4-chloro- or 4-bromobenzyl alcohol, 3.4-dichloro- and 3.4-dibromobenzyl alcohol, whereby for technical reasons the chlorine compounds are to be preferred.

If these halogen methyl ethers of the general Formula I, if necessary dissolved in inert organic solvents, for which purpose those given above may be used, are reacted with triphenyl phosphine, then the phosphonium compounds according to this invention of the general Formula II are obtained direct. They are obtained, after removal of the organic solvent if necessary, in the form of colourless hygroscopic crystal masses or as colourless to brownish waxes which are more or less easily soluble in cold water according to the composition and have an extraordinarily bitter taste.

Finally a further method for the production of the highly active phosphonium compounds according to this invention of the general Formula II consists in starting from phenols which either contain no halogen or are poor in it—preferably phenols of the diphenyl and phenoxyphenyl series. These are then converted into the aryloxyalkyl-chloromethyl ethers as described above and reacted with triphenyl phosphine to produce the quaternary phosphonium compounds, which are then afterhalogenated. Chlorine or bromine come into consideration as halogens; as halogenating agents for example the elements, if necessary in nascent form or in the presence of catalysts such as iodine or iron salts, or halogenating agents such as e. g. the sulphuryl halides. The halogenation is advantageously performed in inert organic solvents or diluents; as such higher halogenated aliphatic or aromatic hydrocarbons come into question, e. g. tetrachlorethane, trichlorobenzene. Also glacial acetic acid may be used. The halogenated phosphonium compounds so obtained, after removal of the organic solvent, are obtained either in the form of colourless crystal masses with a low melting point or of pale brown wax-like masses according to the composition and degree of halogenation. The products are easily soluble in cold water.

By impregnating goods made up from keratin fibres such as wool, furs, feathers, hair and similar material with diluted solutions of the quaternary phosphonium compounds according to this invention, the goods are not only given a lasting and good protection from injurious beetle larvae but are also effectively protected from damage by moths. The new phosphonium compounds are distinguished from similar previously known compounds by a greater range of action and often by better wet fastness properties on wool.

The following examples illustrate the invention without limiting it in any way. Where not otherwise stated, parts are given as parts by weight and the temperatures are in degrees centigrade. The relationship of parts by weights to parts by volume is that of kilogrammes to litres.

*Example 1*

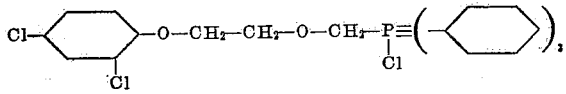

82 parts of 2.4-dichlorophenol are dissolved in 200 parts of 10% caustic soda lye, 47 parts of glycol chlorohydrin are added and the whole is heated under reflux for 12 hours, at the end of which time the solution has a weak alkaline reaction. The solution is ethered out and the ethereal solution is washed with 5% caustic soda lye until no more dichlorophenol can be traced in the washing water. After washing neutral and distilling off the ether, the oxethyl-2.4-dichlorophenyl ether which remains is distilled in vacuo at 158–160° under 11 mm. pressure. The white congealed mass melts at 57–58°. Analysis by determination of the acetyl number shows the 100% purity of the product.

21 parts of the oxethyl-2.4-dichlorophenyl ether are dissolved in 300 parts of benzene and 6 parts of paraformaldehyde are added. Hydrogen chloride is then introduced at 20–25° until unused hydrogen chloride is given off from the solution. The water formed by the reaction is removed and the benzene solution is dried. After distilling off the benzene in vacuo, a weakly blue-violet coloured viscous liquid, 2.4-dichlorophenoxethyl-chloromethyl ether, remains. The liquid as such is reacted with 26 parts of triphenyl phosphine at 70–80°. After cooling and mixing with acetone, the reaction product is obtained as a white precipitate which is filtered off and dried. This white water soluble powder (M. P. 190–191°) has a bitter taste and wool treated therewith is well protected from attack by Attagenus larvae. According to analysis, the product is 2.4-dichlorophenoxy-ethylene-oxymethyl-triphenyl phosphonium chloride of the formula $C_{27}H_{24}O_2CH_3P$. The corresponding phosphonium bromide with the same action is obtained if hydrogen bromide is used instead of hydrogen chloride.

Analogous compounds produced by the same method starting from 82 parts of 2.5-dichlorophenol or 3.4-dichlorophenol or from 64 parts of 4-chlorophenol can be obtained, which compounds also have a similar action.

Similarly 55 parts of 1.2-propylene chlorohydrin, 63 parts of butylene chlorohydrin or 76 parts of 1.6-hexamethylene chlorohydrin can be used instead of 47 parts of glycol chlorohydrin to obtain similar compounds.

*Example 2*

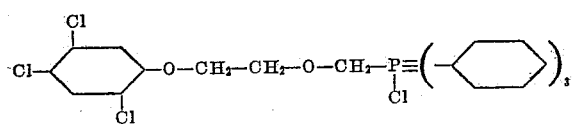

99 parts of 2.4.5-trichlorophenol are dissolved at 40–50° in 200 parts of 10% caustic soda lye, 40.5 parts of glycol chlorohydrin are added and the whole is heated for 4 hours at 90–95°. The oxethyl-2.4.5-trichlorophenyl ether is separated from the alkaline water and washed several times till the washing water is neutral whereupon it is distilled (B. P.$_{14}$ 185–186°). The white congealed mass melts at 63°.

24 parts of the oxethyl-2.4.5-trichlorophenyl ether are dissolved in benzene as described in Example 1, 6 parts of paraformaldehyde are added and hydrogen chloride is introduced until the solution is saturated whereby it becomes clear. The water formed by the reaction is removed and the benzene solution is dried. After distilling off the benzene, a viscous liquid remains which, dissolved in a little benzene, is boiled with 26 parts of triphenyl phosphine. After cooling, the precipitate is filtered off and washed with a little acetone. The white powder formed dissolves easily and completely in cold water; it has an extremely bitter taste and melts at 170–174°. The product is distinguished by its strong activity against Attagenus larvae. According to analysis, it is 2.4.5-trichlorophenoxy-ethyleneoxy-methyltriphenyl phosphonium chloride of the formula $C_{27}H_{33}O_2Cl_4P$. The corresponding phosphonium bromide with a similar action is obtained when hydrogen bromide is used in the above example instead of hydrogen chloride.

Analogous bodies produced by the same method starting from 99 parts of 2.4.6-trichlorophenol or 3.4.5-trichlorophenol can be obtained, which compounds have a similar action.

*Example 3*

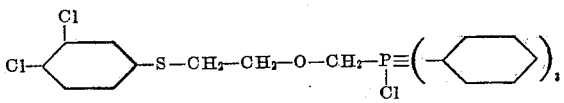

54 parts of 3.4-dichlorothiophenol are dissolved in 165 parts of 10% caustic soda dye, 34.5 parts of glycol chlorohydrin are added dropwise and the whole is heated for 4 hours at 90–95°. After cooling, the solution is taken up in ether, and is washed with diluted caustic soda lye and water until the washing liquor is neutral whereupon it is distilled in vacuo (B. P.$_{11}$ 186–188°). 23 parts of the oxethyl-3.4-dichlorophenylthioether obtained, a clear water-like liquid, are dissolved in benzene and 6 parts of paraformaldehyde are added. Hydrogen chloride is introduced at room temperature until the solution is clear, the water formed is removed and the benzene solution is dried. After distilling off the benzene, 3.4-dichlorophenylmercaptoethylene-chloromethyl ether remains as a viscous pale yellow liquid which, after standing for a considerable time, congeals. It is then reacted at 80° with 24 parts of triphenyl phosphine. After cooling and mixing with acetone, a white powder is obtained which dissolves completely in cold water. The compound can be further purified by dissolving in alcohol and precipitating with acetone or ether. M. P. 157–159°.

The product has a strong action against Attagenus larvae. According to analysis it is 3.4-dichlorophenyl-mercaptoethyleneoxy-methyltriphenyl phosphonium chloride of the formula $C_{27}H_{24}OSCl_3P$. The corresponding phosphonium bromide with the same action can be obtained if, in the above example, hydrogen bromide is used instead of hydrogen chloride.

*Example 4*

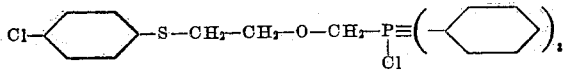

72 parts of 4-chlorothiophenol are dissolved in 210 parts of 10% caustic soda lye. 44 parts of glycol chlorohydrin are added at 30–40° and the whole is heated for 4 hours in a water bath. The oil which precipitates is separated from the liquor and washed several times with water until the water is neutral. The clear pale liquid is distilled at 168–170° under 13 mm. pressure. Determination of the acetyl number shows that the product is pure 4-chlorophenyl-oxethyl thioether. 19 parts of this product are dissolved in benzene and 3.5 parts of paraformaldehyde are suspended therein. Hydrogen chloride is introduced and then the procedure described in Example 3 is followed. The 4-chlorophenylmercaptoethylene-chloromethyl ether is a pale yellow viscous liquid. It is reacted at the boil with 26 parts of triyphenyl phosphine in 40 parts of benzene. The reaction product which precipitates on cooling is washed with acetone and dried. It is a white powder which melts at 179° and has a bitter taste. It has a good action against Attagenus larvae and bacteria which attack cellulose fibres. According to analysis it is 4-chlorophenylmercaptoethyleneoxy-methyl-triphenyl phosphonium chloride of the formula $C_{27}H_{25}OSCl_2P$

Example 5

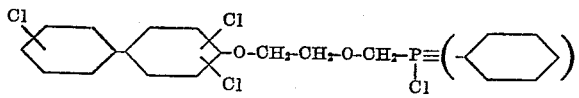

10.7 parts of oxethyl-p-diphenylyl ether are dissolved in benzene, 3.5 parts of paraformaldehyde are suspended therein and hydrogen chloride is introduced until unused hydrogen chloride is given off from the solution. The benzene solution is dried and the benzene is distilled off in vacuo. The 4-phenylphenoxyethylene-chloromethyl ether which remains is reacted at 80° with 13 parts of triphenyl phosphine. The phosphonium compound is dissolved in alcohol and precipitated with ether. A white powder is obtained which completely dissolves in cold water and has a good action against bacteria which damage cellulose fibres. It melts at 149–151°. According to the chlorine analysis it is 4-phenylphenoxyethyleneoxy-methyltriphenyl phosphonium chloride of the formula $C_{33}H_{30}O_2ClP$.

105 parts of 4-phenylphenoxyethyleneoxy-methyltriphenyl phosphonium chloride are suspended in 100 parts by volume of glacial acetic acid and chlorine gas is introduced at 50–55° until the exothermic reaction is complete. The reaction product is precipitated with ether and recrystallised from alcohol-ether. It contains 4-chlorine atoms of which 1 is ionogenically bound.

Ionogenic chlorine: Found, 5.79%; Calculated, 5.64%.
Total chlorine: Found 22.4%; Calculated, 22.6%

Wool treated with it is protected against attack by moths and beetle larvae.

Example 6

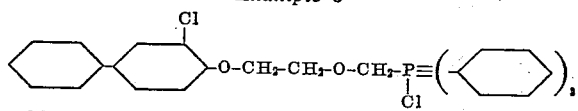

98 parts of 3-chloro-4-hydroxydiphenyl (M. P. 79–80°) are dissolved with the addition of 21 parts of caustic soda in 400 parts by volume of water and 50 parts of ethylene chlorohydrin are added dropwise at 90–95°. The whole is stirred for 1 hour and then filtered. After being recrystallised several times from carbon tetrachloride, the 2-chloroxenoxyethyl alcohol obtained melts at 81–82°. 49 parts of 2-chloroxenoxyethyl alcohol with 9 parts of paraformaldehyde are suspended in 200 parts by volume of benzene and hydrogen chloride is introduced until it is given off unused from the mixture. The aqueous layer is removed and the benzene layer is dried with $CaCl_2$. After evaporating the solvent in vacuo, 58 parts of 2-chloroxenoxyethyl-chloromethyl ether remain. It is dissolved in 150 parts by volume of chlorobenzene and 52 parts of triphenyl phosphine are added. The whole is heated for 3 hours at 80–85° and after cooling, mixed with ether until crystallisation occurs whereupon the crystals are filtered off and dried.

The quaternary phosphonium compound is a hygroscopic powder and, calculated on the formula $C_{33}H_{29}O_2Cl_2P$ gives the following analytical values:
Ionogenic Cl: Found, 6.9%; Calculated, 6.35%. Cl: Found, 12.2%; Calculated, 12.7%.

Used in the manner described in Example 12, the product gives wool effective protection against beetle larvae.

A similar product is obtained if instead of 3-chloro-4-hydroxydiphenyl used in the above example, 114 parts of 3.5-dichloro-4-hydroxydiphenyl (M. P. 84–85°) are used and the same procedure is followed.

Example 7

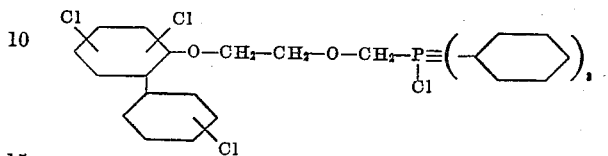

21.5 parts of the β-oxethyl ether of 2-hydroxydiphenyl are dissolved in benzene, 7 parts of paraformaldehyde are added and hydrogen chloride is introduced until complete solution is attained, which occurs after about 4–5 hours. The benzene solution is then dried and the benzene is distilled off in vacuo.

The 2-phenylphenoxy-ethyl-chloromethyl ether which remains is reacted with 22 parts of triphenyl phosphine by slow heating to 80°. The phosphonium compound is dissolved in alcohol and, after filtering the solution, ether is added and finally the precipitate is mixed with petroleum ether. A white powder which melts at 67–68° is obtained which, in the air, melts into a yellow paste. According to analysis it is 2-phenylphenoxy-ethyleneoxy-methyltriphenyl phosphonium chloride of the formula $C_{33}H_{30}O_2ClP$.

Calculated: 6.78% chlorine; Found: 6.7% chlorine.

Chlorinated according to Example 5, a chlorination product is obtained which has similar properties to the compound obtained according to Example 5.

Example 8

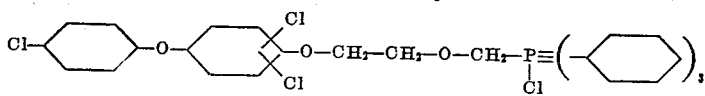

26.5 parts of 4-(β-hydroxyethoxy)-4'-chlorodiphenyl ether (M. P. 75–76°) are dissolved in benzene and 6 parts of paraformaldehyde are added. Hydrochloric acid gas is then introduced at room temperature until the solution is saturated and becomes clear. The benzene solution is then dried and the benzene is distilled off. The 4-[chloromethoxy-(ethoxy)]-4-'-chlorodiphenyl ether which remains is reacted with 26 parts of triphenyl phosphine at 80°. After cooling, the reaction product is dissolved in acetone and precipitated with ether. According to analysis it is 4-(4'-chlorophenoxy)-phenoxy-ethoxy-methyl-triphenyl phosphonium chloride of the formula $C_{33}H_{29}O_3Cl_2P$ and is in the form of a semi-solid somewhat sticky mass.

15 parts of this compound are dissolved in 30 parts of glacial acetic acid and 4 parts of chlorine are introduced at 50–55°. After proceeding as described in Example 1, a phosphonium compound is obtained which easily dissolves in water and which, apart from ionogenic chlorine contains 3 chlorine atoms.

Ionogenic chlorine: Calculated, 5.51%; Found, 5.40%.
Total chlorine: Calculated, 22.1%; Found, 21.8%.

Wool treated therewith is protected from attack by moths and beetle larvae. This protection remains after several household washings.

Example 9

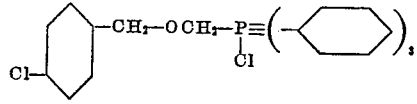

28 parts of p-chlorobenzyl alcohol (B. P.$_{11}$=116–118°) and 12 parts of paraformaldehyde are suspended in 75 parts by volume of benzene and hydrogen chloride is introduced at 5–10° until it is given off unused from the mixture. The aqueous layer is removed and the benzene layer is dried over calcium chloride. After distilling off the solvent in vacuo, 4-chlorobenzyl-chloromethyl ether remains in a nearly 100% yield.

This ether is dissolved in 100 parts by volume of chlorobenzene, 52 parts of triphenyl phosphine are added and the whole is heated for 3 hours at 80–85°. After cooling, the easily water soluble white hygroscopic crystalline phosphonium compound is filtered off and dried.

Ionogenic chlorine: Found, 8.2%; Calculated, 7.84%. Chlorine: Found, 14.9%; Calculated, 15.65%.

Wool treated therewith is protected against attack by moths and beetle larvae. The corresponding phosphonium bromide compound is obtained if hydrogen bromide is used instead of hydrogen chloride.

*Example 10*

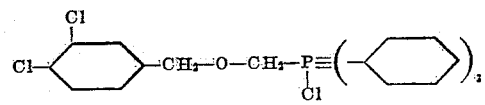

35.4 parts of 3.4-dichlorobenzyl alcohol are dissolved in 75 parts by volume of benzene, 9 parts of paraformaldehyde are added and hydrogen chloride is introduced until a clear solution is obtained. The water formed by the reaction is removed, and the benzene solution is dried over calcium chloride. The excess hydrogen chloride is removed by blowing in air.

52.4 parts of triphenyl phosphine are added to this solution of 3.4-dichlorobenzyl-chloromethyl ether in benzene and the reaction mass is heated for 3 hours at 80–85°. 100 parts by volume of water are then stirred in and the aqueous layer is removed. The last traces of benzene are removed by blowing in air. The quaternary phosphonium compound is then precipitated from the aqueous layer with common salt. The greasy mass is dried and finally dissolved in alcohol and reprecipitated with ether. It gives wool effective protection from damage caused by beetle larvae.

Analysis shows it has the formula $C_{26}H_{22}OCl_3P$.

*Example 11*

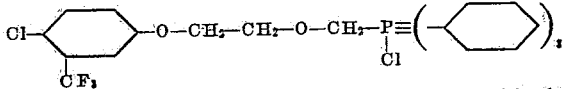

25 parts of 3-trifluoromethyl-4-chlorophenol with the addition of 5.5 parts of caustic soda are dissolved in 150 parts of water and 12 parts of ethylene chlorohydrin are added dropwise at 90–95°. The whole is stirred for 1 hour, after cooling, the reaction mass is taken up in ether and then shaken out first with diluted caustic soda lye and then with water and then dried over Glauber's salt. After distilling off the ether, 22 parts of 3-trifluoromethyl-4-chlorophenoxyethyl alcohol remain.

This residue is dissolved in 75 parts by volume of benzene, 5.5 parts of paraformaldehyde are added and hydrochloric acid gas is introduced until it is given off unused. The aqueous layer is removed, the benzene layer is dried over CaCl₂ and the solvent is distilled off in vacuo. 23 parts of 3-trifluoromethyl-4-chlorophenoxyethyl-chloromethyl ether are obtained as residue.

This is dissolved in 25 parts by volume of chlorobenzene and heated with 22 parts of triphenyl phosphine for 3 hours at 80–85°. After cooling, the quaternary compound is ethered out, and recrystallised from alcohol-ether.

35 parts of phosphonium compound in the form of a viscous liquid mass are obtained. It is very easily soluble in water.

The product effectively protects wool from attack by beetle larvae.

*Example 12*

1 part of a phosphonium compound produced according to any of the Examples 1 to 11 is dissolved in warm water (liquor ratio 1:20 to 1:50). 100 parts of previously wetted, dyed or undyed wool are treated in this liquor. While moving the wool, the temperature is raised within 30 minutes to 60° and then kept at this temperature for 30 minutes. The goods can be wrung out and dried without rinsing. Wool so treated is protected from attack by moths and beetle larvae. The wool is equally well protected even after many household washings.

What we claim is:

1. An organic quaternary phosphonium compound of the general formula:

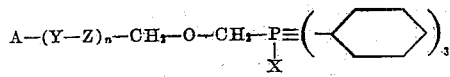

wherein A represents a member selected from the group consisting of halogen-substituted phenyl, diphenylyl and phenoxyphenyl radicals, which halogen has an atomic weight of at least 35 and at most 80, Y represents a member selected from the group consisting of oxygen and sulphur, Z represents a divalent aliphatic hydrocarbon radical of 1 to 5 carbon atoms, n represents a whole number of the value of 0 to 1, X represents a halogen atom selected from the group consisting of chlorine and bromine.

2. An organic quaternary phosphonium compound of the formula:

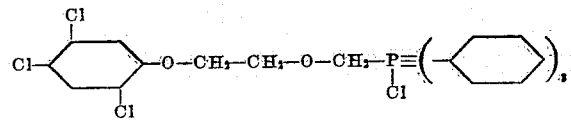

3. An organic quaternary phosphonium compound of the formula:

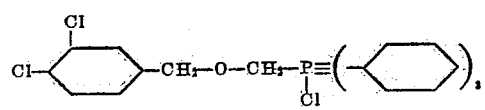

4. An organic quaternary phosphonium compound of the formula:

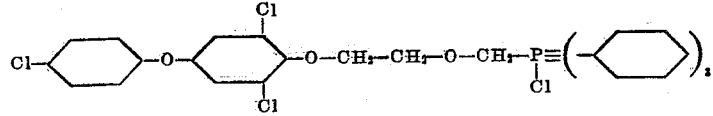

5. An organic quaternary phosphonium compound of the formula:

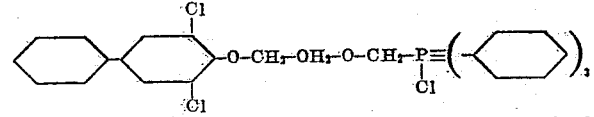

6. An organic quaternary phosphonium compound of the formula:

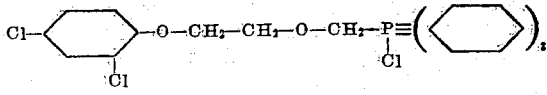

7. A polyhalophenoxyethoxymethyl - triphenyl - phosphonium chloride, wherein the halogen atoms specified are selected from the group consisting of chlorine and bromine.

References Cited in the file of this patent

UNITED STATES PATENTS

| | | |
|---|---|---|
| 1,921,364 | Lommel et al. | Aug. 8, 1933 |
| 2,291,528 | Bruson et al. | July 28, 1942 |
| 2,353,964 | Lommel et al. | July 18, 1944 |